United States Patent
Maxa et al.

(10) Patent No.: US 7,565,641 B2
(45) Date of Patent: Jul. 21, 2009

(54) SECURELY PROVIDING EXTENSIBLE THIRD-PARTY PLUG-INS

(75) Inventors: Adrian Maxa, Kirkland, WA (US); Marilyn Chen, Atherton, CA (US); Michael Stokes, Eagle, ID (US); Mark Lawrence, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 11/165,363

(22) Filed: Jun. 24, 2005

(65) Prior Publication Data
US 2006/0294372 A1 Dec. 28, 2006

(51) Int. Cl.
*G06F 9/44* (2006.01)

(52) U.S. Cl. .............. 717/105; 717/109; 717/113; 717/127

(58) Field of Classification Search ........ None
See application file for complete search history.

(56) References Cited

U.S. PATENT DOCUMENTS 7,231,661 B1 * 6/2007 Villavicencio et al. ......... 726/4

* cited by examiner

*Primary Examiner*—Chuck O Kendall
(74) *Attorney, Agent, or Firm*—Shook, Hardy & Bacon LLP

(57) ABSTRACT

The present invention is directed to a system and method of securely providing extensible third-party plug-ins to user computers. The system enables third-parties to authenticate themselves to user computers before a user computer is allowed to load the plug-ins. The system also creates separate processes that are spawned from a main process in order to securely execute the third-party plug-ins. Security is further enhanced by assigning a privilege level to the separate process that is lower than the main process.

20 Claims, 9 Drawing Sheets

SECURELY PROVIDING EXTENSIBLE THIRD-PARTY PLUG-INS

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Third-party vendors typically provide extensibility for their software through plug-ins including Dynamic Link Libraries (DLL). A DLL is a small application, or sometimes a group of small applications, that can be called on by a larger application to provide a service or set of instructions. A DLL can reside within a WINDOWS operating system itself or within WINDOWS applications. A DLL can be utilized to control various functions within a user computer such as controlling a color management conversion engine.

In conventional third-party extensible software, third-party vendors were either allowed full access to core system functionalities, or were denied any privileges to modify system behavior. However, giving total extension ability to a third-party poses a potential security risk due to an increased risk that an attack to a user's operating system could occur.

SUMMARY

The present invention introduces a system that can be configured to improve the security for allowing third-party vendors to load their extensible software onto user computers. Additionally the system can authenticate authorized third-party users before loading their extensible software onto user computers. The system can be adapted to protect an operating system of a user computer even from authenticated and authorized users by creating a separate process to run third-party plug-ins.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A solution is needed for improving security for allowing third-party vendors to load their extensible software onto user computers. Accordingly, a solution is needed to authenticate authorized third-party users before loading their extensible software onto user computers. A solution should protect an operating system of a user computer even from authenticated and authorized users by creating a separate process to run third-party plug-ins. A method is needed that combines methods of authenticating and validating a third-party vendor, creating a separate process for running third-party plug-ins, and creating the separate process to execute plug-ins at a lower priority/privilege level in order to provide improved extensibility along with improved security.

The present invention discloses a system to securely provide extensible plug-ins. The system can include an authentication service for determining the authenticity of the third-party plug-in. The system can further include a verification service for verifying previously-loaded third-party plug-ins before the previously-loaded third-party plug-ins are subsequently executed. The system can additionally include a main processor for interfacing with third-party plug-ins and for spawning separate processors to execute the third-party plug-ins, wherein the separate processors are of a lower privilege level than the main processor.

Figure 1:
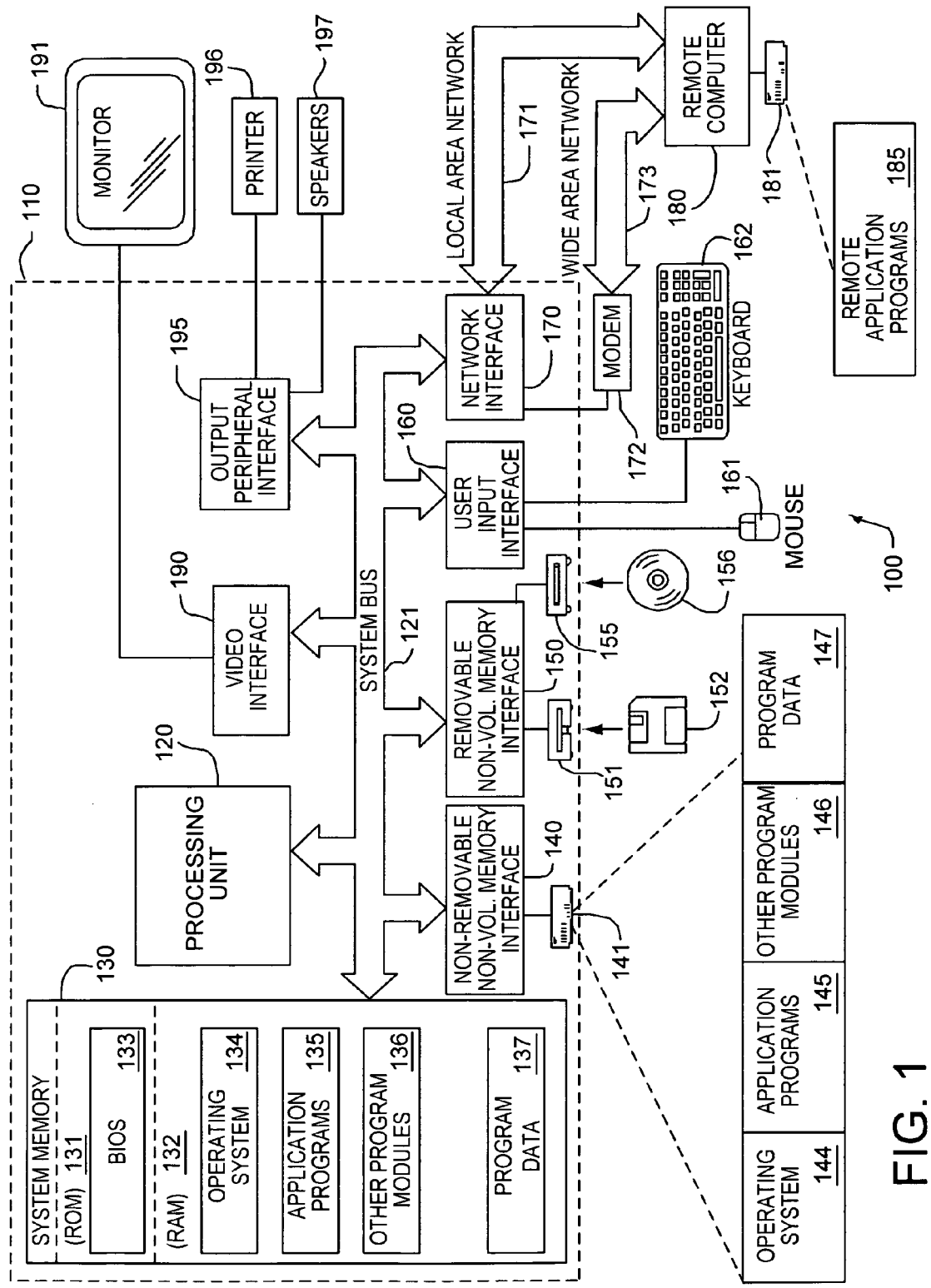
FIG. 1 illustrates a computing environment in which a system and method for securely providing extensible third-party plug-ins to users can operate.

FIG. 1 is a block diagram that illustrates a computing environment in which a system and method for securely providing extensible third-party plug-ins to users can operate according to embodiments of the present invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
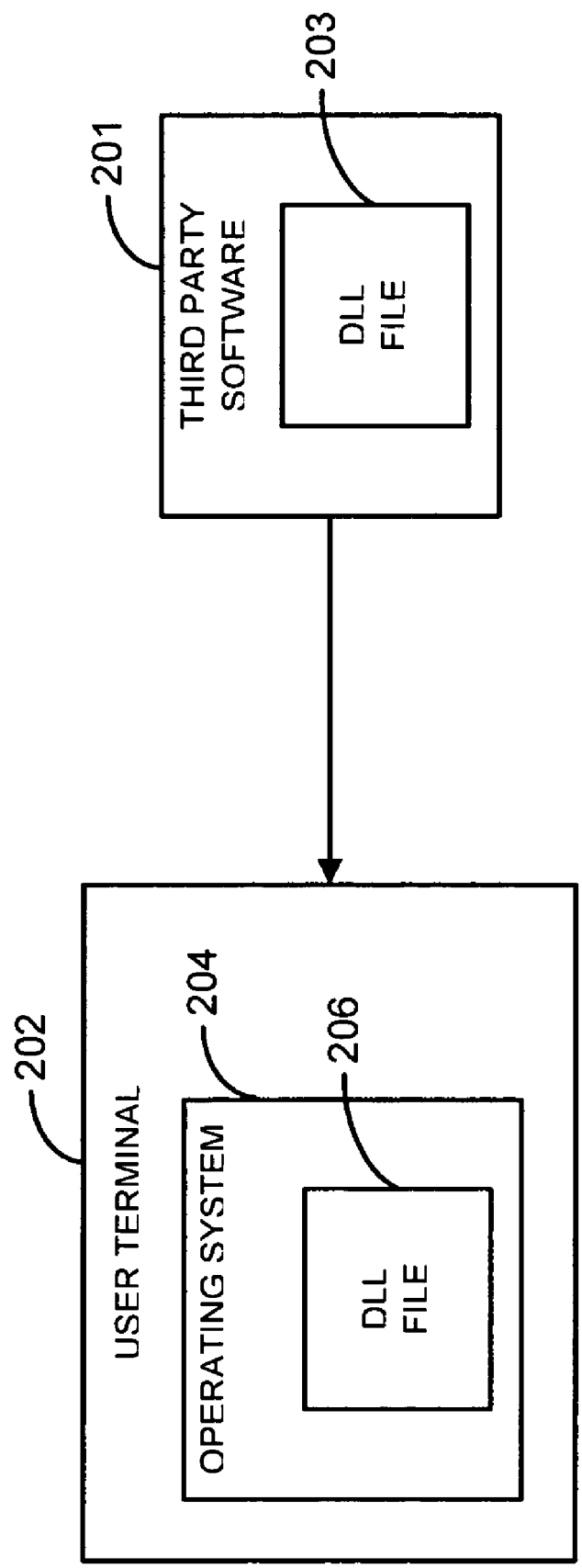
FIG. 2 illustrates an exemplary embodiment for loading third-party plug-ins into a user computer.
Figure 3:
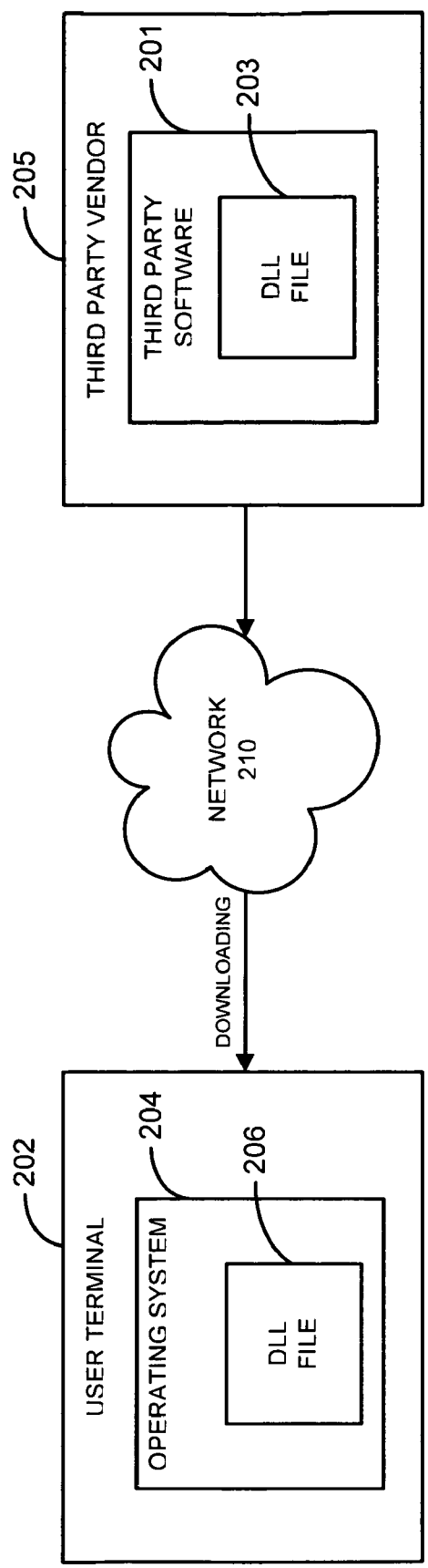
FIG. 3 illustrates another exemplary embodiment for loading third-party plug-ins into a user computer.
Figure 4:
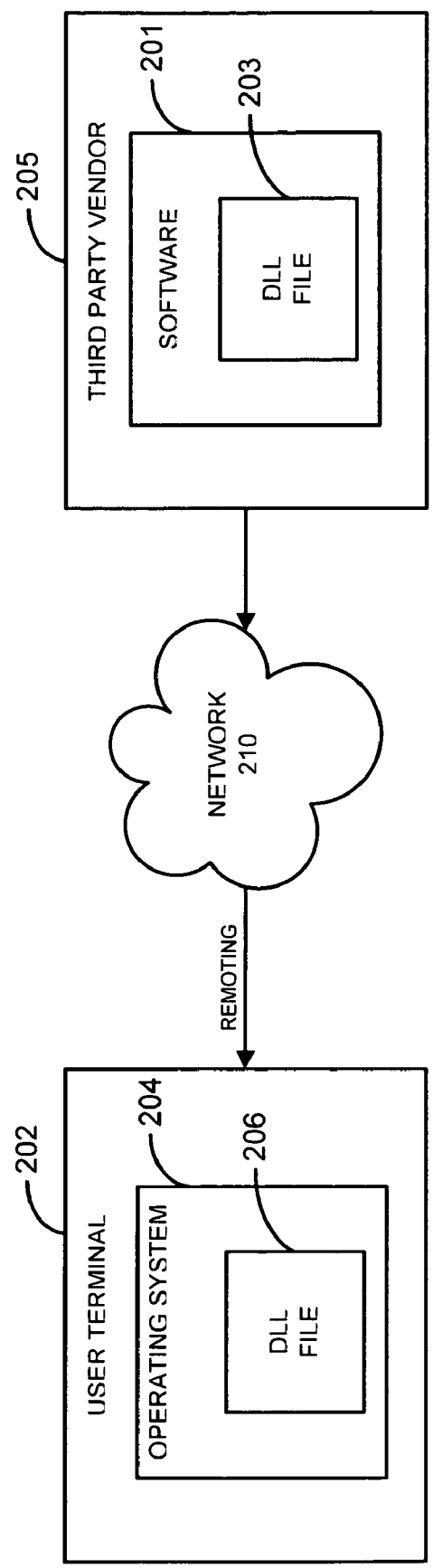
FIG. 4 illustrates yet another exemplary embodiment for loading third-party plug-ins into a user computer.

With reference to FIGS. 2, 3, and 4, the following will describe various embodiments of the present invention. FIG.

2 illustrates an exemplary embodiment for loading third-party plug-ins into a user computer. User computer 202 may include operating system 204 and one of a plurality of Dynamic Link Library (DLL) plug-in files 206. Third-party software 201 can contain a DLL file 203 that provides meaningful extensibility to the function of DLL file 206. For example, DLL file 206 on user computer 202 can control the function a color management system for displaying color for certain applications. An example of such color management system is the Windows Color System (WCS).

The Windows Color System (WCS) introduces three new XML-based color profile formats: the Device Model Profile (DMP) format, the Color Appearance Model Profile format (CAMP), and the color Gamut Map Model Profile format (GMMP). These new formats target state of the art color science and engineering as well significant improvements in manageability and transparency. The DMP and GMMP WCS profile formats support the ability for third-parties to provide plug-in device model and gamut map model modules. This can be accomplished by inserting an optional plug-in XML node into the baseline device model DMP schema or baseline gamut map model GMMP schema. In an embodiment, this baseline information can be provided as a fall back solution in case the plug-in module is not available. The plug-in modules may be Common Object Model (COM) based. The plug-in modules may contain a unique GUID that may be generated when developing the plug-in COM DLL module and registered by the plug-in manufacturer using the normal COM processes. This GUID can be inserted into the DMP or GMMP to associate the profile with the module.

DLL file 203 can be created by a third-party to enable users to modify or customize certain color schemes of certain applications within the WCS, thereby providing extensibility and versatility that DLL 206 does not provide. It should be understood that controlling the functions of a WCS is only an example of a function that DLL files 206 and 203 can possess, and should not be limited to just such function. DLL files 206 and 203 can be used to control any of an array of functions within the operating system 206.

Third-party software 201 may take the form of a compact disk (CD), universal serial bus (USB) device, floppy disk, DVD, or any other portable data storage device that can be loaded into user computer 202. Once third-party software is loaded into user computer 202, DLL file 203 is stored and can be employed to take over and handle the functions of DLL file 206.

FIG. 3 illustrates another exemplary embodiment for loading third-party plug-ins into a user computer. Third-party vendor 205 can store third-party software 201 and DLL file 203. User computer 202 can communicate with third-party vendor 205 through network 210. Network 210 may be, for example, the Internet. User computer can download and store DLL file 203 from third-party vendor 205 through network 210.

FIG. 4 is yet another exemplary embodiment for loading third-party plug-ins into a user computer. FIG. 4 illustrates another example of how a user can obtain the functionality of DLL file 203. User computer 202 can communicate with third-party vendor 205 through network 210, and can request DLL file 203 from third-party vendor 205. Third-party vendor 205 can utilize DLL file 203 to remotely control the functionality of DLL file 206 on user computer 202. Through this embodiment, user computer 202 can take advantage of the extensibility of DLL file 203 without having to allocate space within its memory. Such an embodiment may be advantageous for when a user does not wish to utilize DLL file 203 for a long period of time.

Figure 5:
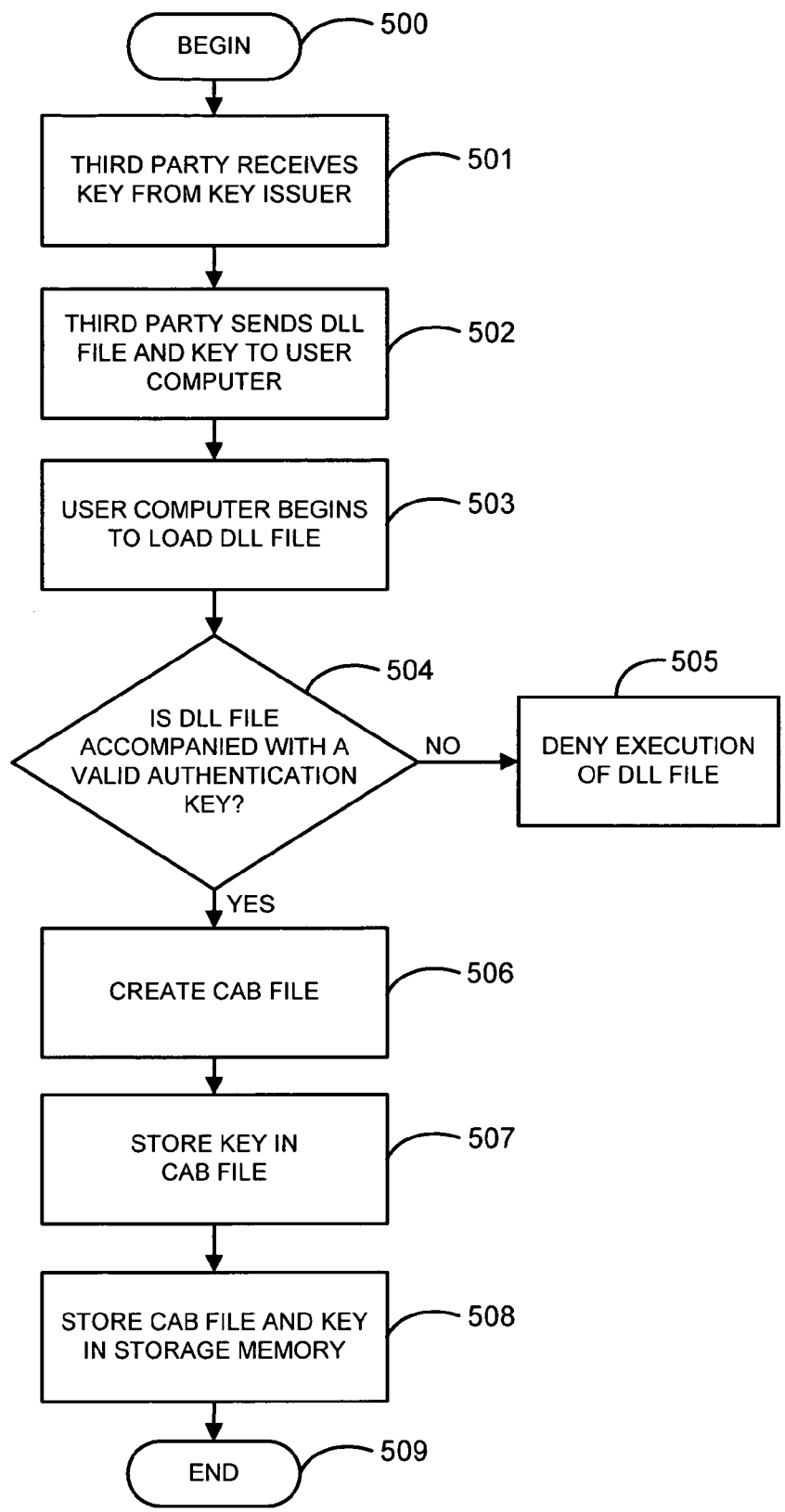
FIG. 5 illustrates a method for securely installing a third-party DLL file.
Figure 9:
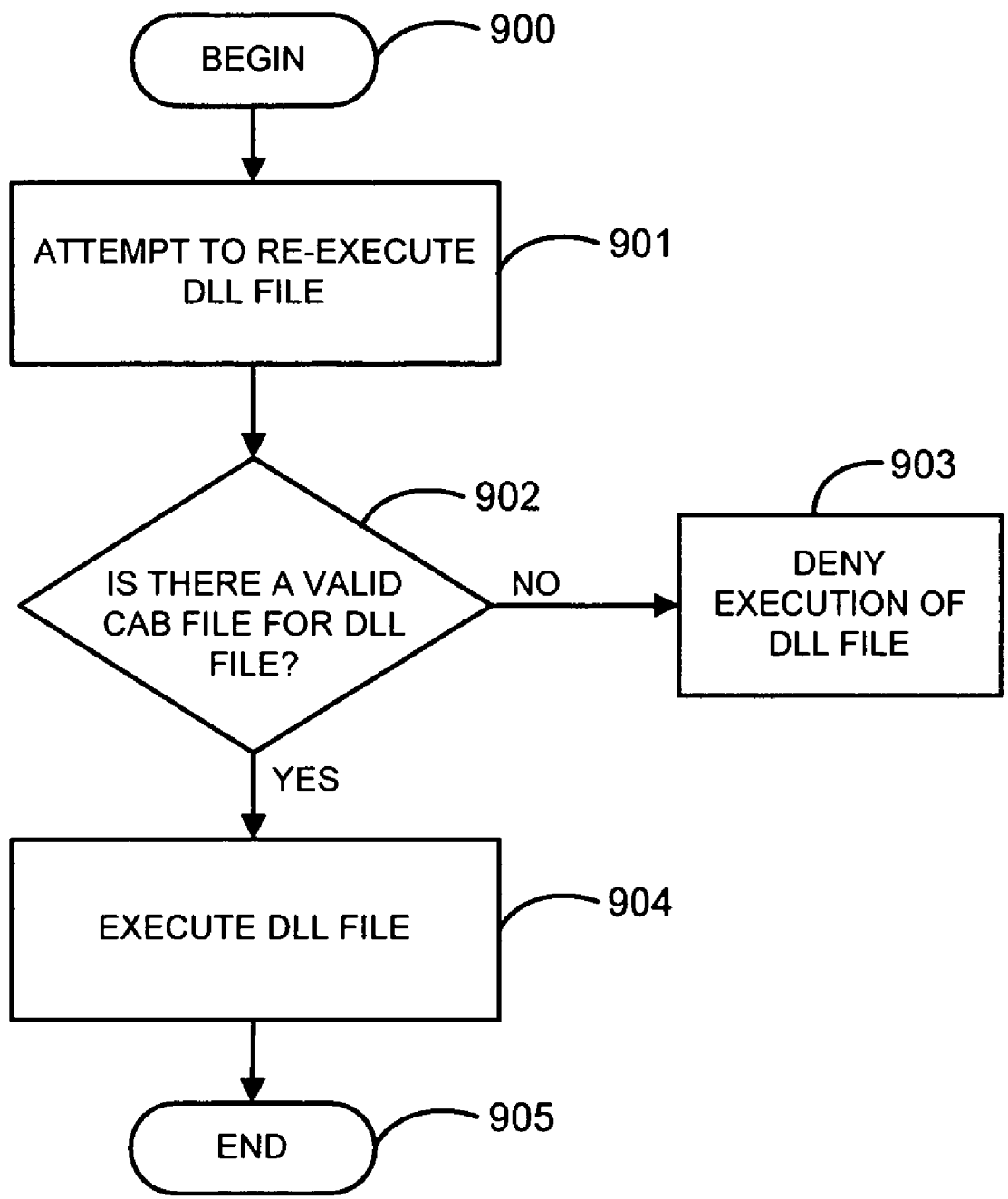
FIG. 9 illustrates a method for subsequently executing a DLL file after it has initially been loaded onto a user computer

With reference to FIGS. 5 and 9 the following will describe embodiments for authenticating and validating a third-party DLL a FIG. 5 illustrates a method for securely installing a third-party DLL file. The method begins with a third-party vendor receiving an authentication key from a Key Issuer 501. A Key Issuer is an entity that is trusted among all user computers. Key issuers deliver unique authentication keys to approved third-party vendors for the purpose of authenticating and validating their plug-ins with user computers. In an embodiment, each authentication key can specifically identify a particular third-party vendor. When a user computer receives a valid authentication key from a third-party vendor, the user computer can then know that the vendor has already been approved by the Key Issuer, and content, including plug-ins, should be considered trusted.

Once the third-party vendor receives its assigned authentication key, it can attempt to authenticate its DLL file with a user computer that wishes to utilize the DLL file. The third-party vendor sends 502 its authentication key and DLL file to the user computer, and the user computer proceeds to begin loading 503 the DLL file. While loading, an authentication service within the user computer determines 504 if the DLL file is accompanied with a valid authentication key. This determination step can be handled in various ways. In one embodiment, the authentication service may receive an automatic update every time a new key is issued from the Key Issuer, and can store this update on the user computer. Alternatively in another embodiment, the authentication service may contact the Key Issuer when the user computer receives an authentication key from a third-party vendor and have the Key Issuer remotely authenticate the vendor for the user. In still another embodiment, the key can be self-verifying; such as by a bit or parity check.

If the DLL file is not accompanied with a valid authentication key, the authentication service determines that the third-party vendor and corresponding DLL file are not authenticated, and the user is denied 505 the ability to execute the vendor's DLL file. If the authentication service determines that the third-party vendor indeed possess a valid authentication key, the authentication service creates 506 a CAB file. In one embodiment, the user computer can then store 507 the authentication key in the CAB file. The user computer can then store 509 the CAB file and key in its storage memory. In another embodiment, the user computer can store a character string associated with the authentication key within the CAB, and then store the CAB file and the character string within its storage memory.

FIG. 9 illustrates a method for subsequently executing a DLL file after it has initially been loaded onto a user computer. Once an attempt has been made by the user computer to re-execute a previously-loaded DLL file, a verification service will verify 902 that there is a valid CAB file associated with the previously-loaded DLL file. If the verification service determines that there is not a valid corresponding CAB file for the previously-loaded DLL file, the verification service will deny 903 execution of the previously-loaded DLL file. If the verification service determines that there is a valid corresponding CAB file, the verification service will proceed to execute 904 the previously-loaded DLL file.

Figure 6:
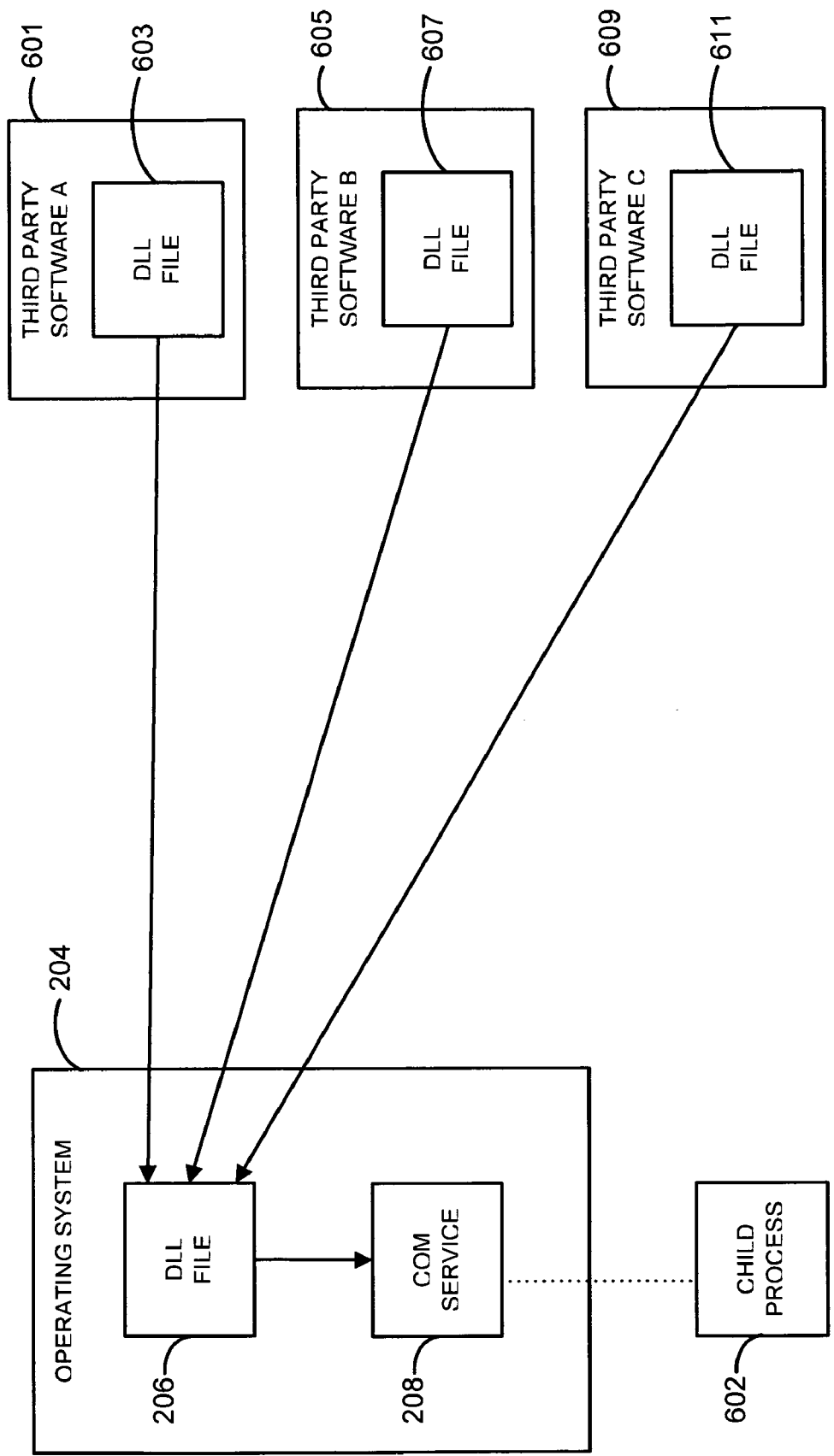
FIG. 6 illustrates a procedure for a main process to create a child process in order to run a third-party DLL file.
Figure 7:
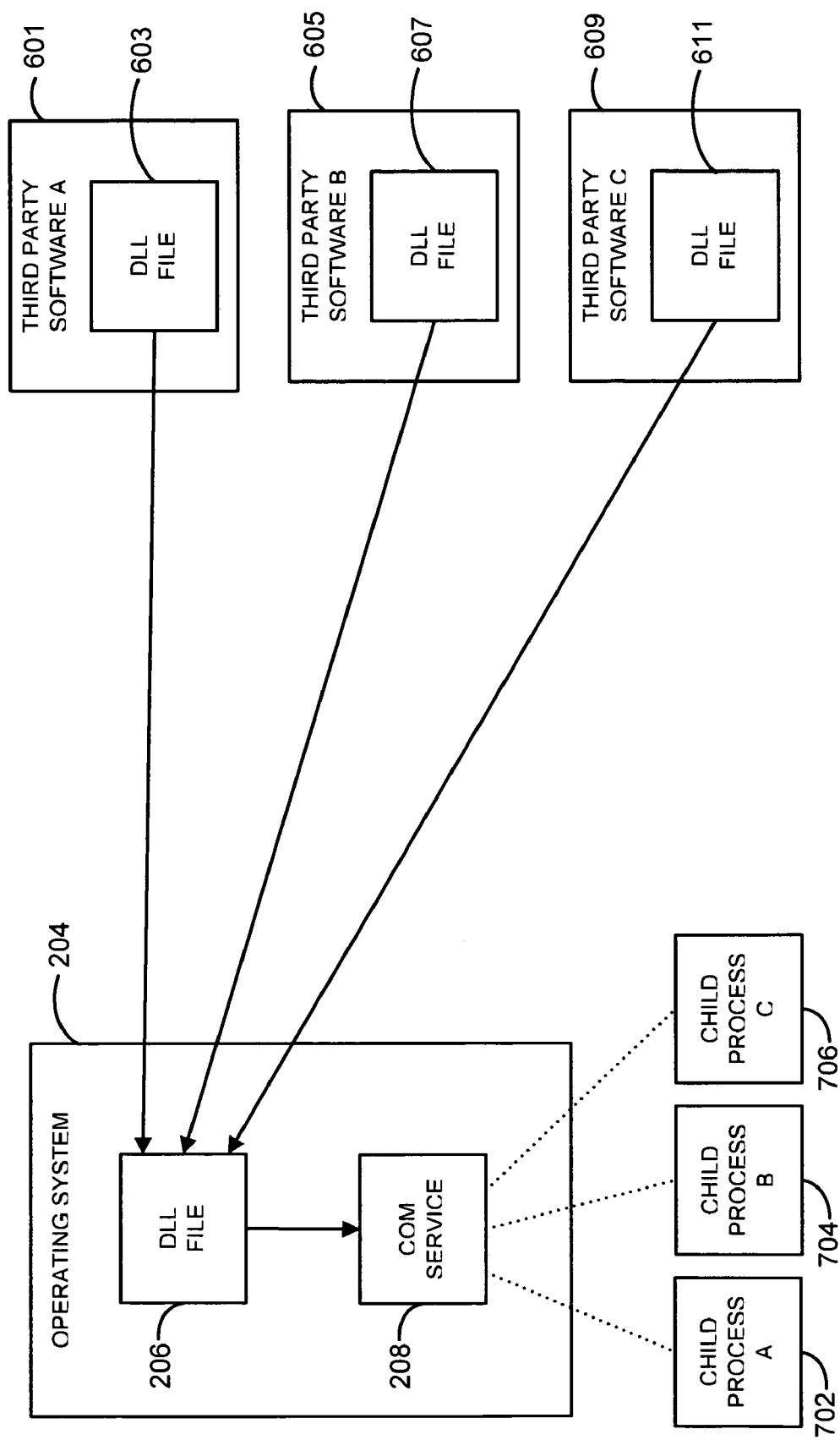
FIG. 7 illustrates an alternative embodiment for spawning child processes.
Figure 8:
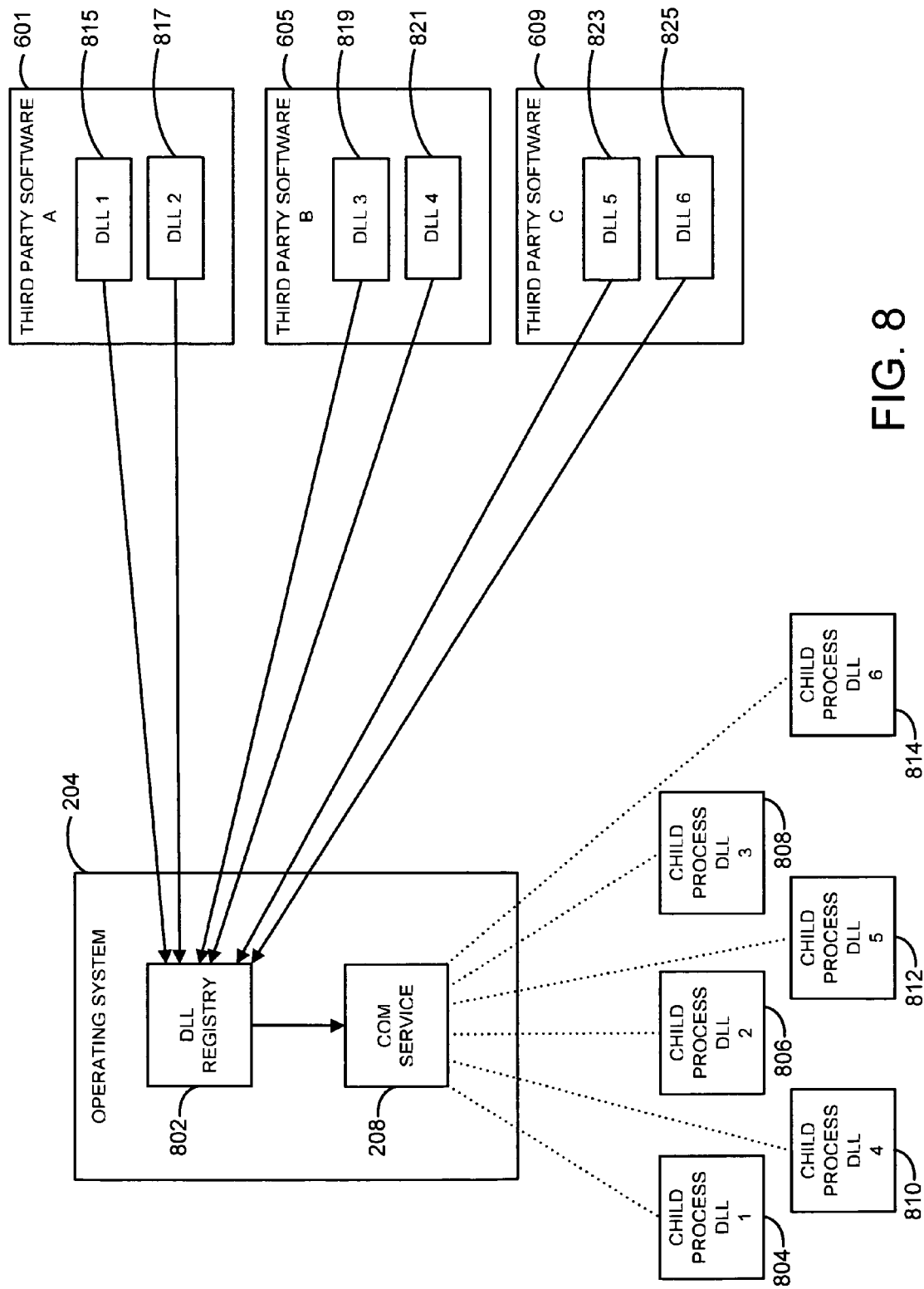
FIG. 8 illustrates yet another alternative embodiment for spawning child processes.

With reference to FIGS. 6-8, the following will describe embodiments for executing third-party DLL files. FIG. 6 illustrates a procedure for a main processor, running a main process, to create a child processor, running a child process, in order to execute a third-party DLL file. FIG. 6 shows third-party software A (601), B (605), and C (609), each containing DLL file 603, 607, and 611 respectively. Third-party software A, B, and C are created from different third-party vendors A, B, and C (not shown) respectively. DLL files 603, 607, and 611 each control the same functionality of DLL file 206 stored in operating system 204, however, DLL files 603, 607, and 611 can each have their own extensible attributes that distinguish each one from the other.

Common Object Model (COM) service 208 is an example of a main calling processor, running a main process, that is used to interface with third-party DLL files and execute third-party DLL files. With reference to FIG. 6, the COM service can spawn a child process 602 to run all third-party DLL files including 603, 607, and 611. In one embodiment, child process 602 can be a process separate from the COM service and can run at a lower privilege level than the COM service. In another embodiment, child process 602 can be used at the lowest possible execution privilege in order to protect the user computer and operating system from unwanted attacks and failed plug-ins. In another embodiment, child process 602 will not be given any read/write access or administrative privileges. Yet in another embodiment, child process 602 cannot spawn other processes and cannot receive privilege to allocate memory for itself, as the user computer can restrict memory by assigning a pre-determined memory space to the child process. For example, in a color management system, child process 602 running either DLL 603, 607, or 611 will just convert source color space to destination color space. The child process 602 can be given a pointer to allocated input and output colors, and can write to an array that is already allocated.

Child process 602 can also be assigned a privilege level that may be dependent on the particular DLL file that it is executing. For example, a user computer could assign a lower or the lowest privilege level to a child process in order to execute certain DLL's, but could alternatively allow a child process to obtain higher privileges to execute other DLL's. However, the spawning of a child process to run all third-party DLL files may be necessary to protect the main calling process in the event of a malicious attack or in event that the DLL file fails; instead of ruining the entire main calling process, only a lower-level/lower-privilege child process created for the sole purpose of running the DLL file will be affected.

FIG. 7 illustrates an alternative embodiment for spawning child processes. In FIG. 7, DLL files 603, 607, and 611 can each control the same functionality of DLL file 206 stored in operating system 204, however, DLL files 603, 607, and 611 can each have their own extensible attributes that distinguish each one from the other. Instead of spawning one child process to run all third-party DLL files as illustrated in FIG. 6, FIG. 7 shows that a separate child process can be spawned to run all DLL files for a particular third-party vendor. For example, as shown in FIG. 7, child process 703 can run all DLL files from third-party A 601, child process 704 can run all DLL files from third-party B 605, and child process 706 can run all DLL files from third-party C 609. This embodiment may be advantageous to implement to protect against the event when a third-party's DLL file fails. In the event one of the third-party's DLL file fails, by creating a separate child process for each third-party, other third-parties will not be prevented from running their DLL files on the user computer.

FIG. 8 illustrates yet another alternative embodiment for spawning child processes. FIG. 8 shows each third-party software containing more than one DLL file. For example, third-party software A (601) contains DLL1 (815) and DLL2 (817), third-party software B (605) contains DLL3 (819) and DLL4 (821), and third-party C (609) contains DLL5 (823) and DLL6 (825). DLL registry 802 stores all DLL files within operating system 204. It should be understood that all DLL files within the operating system may not necessarily be stored in one central location. Nevertheless, DLL registry 802 can store the user computer DLL files that control the same functionality that DLL files 815-825 are attempting to substitute in order to provide new extensibility.

Instead of providing one child process to run all third-party DLL files or even a separate child process for each third-party vendor, FIG. 8 shows that a separate child process can be spawned for each specific third-party DLL file with no regard as to which specific third-party the DLL file comes from. For example, child process 804 can be spawned specifically to run DLL 815, child process 806 can be spawned to specifically run DLL 817, child process 808 can be spawned to specifically run DLL 819, child process 810 can be spawned to specifically run DLL 821, child process 812 can be spawned to specifically run DLL 823, and child process 814 can be spawned to specifically run DLL 825. This embodiment may be advantageous to implement to protect against the event when any third-party DLL file fails. In the event a third-party DLL file fails, by creating a separate child process for all third-party DLL files, other third-party DLL files will not be prohibited from running on the user computer.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

The present invention can implement a method to securely provide programmatic extensibility. The method can include loading a plug-in onto computer and authenticating the plug-in to the computer. The method can additionally include spawning a separate process from a main process to run the plug-in and assigning the separate process a lower privilege level than the main process. A computer-readable medium with instruction for executing the above mentioned method can also be implemented.

Additionally the present invention can be employ a method to securely modify color schemes within a computer. The method can include loading a plug-in, that is capable of modifying color schemes, onto a computer. The method can additionally include authenticating the plug-in to the user computer. Moreover, the method can include spawning a separate process from a main process to execute the plug-in and assigning the separate process a lower privilege level than the main process. The method can further include modifying the color scheme in accordance with the plug-in. A computer-readable medium with instruction for executing the above mentioned method can also be implemented.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A method of securely modifying color schemes within a computer comprising:

loading a plug-in onto a computer, the plug-in being capable of modifying color schemes;

authenticating the plug-in to the user computer;

spawning a separate process from a main process to execute the plug-in;

assigning the separate process a lower privilege level than the main process; and modifying the color scheme in accordance with the plug-in.

2. The method according to claim 1, wherein spawning the separate process further comprises spawning one separate process to run all plug-ins.

3. The method according to claim 1, wherein spawning the separate process further comprises spawning a separate process for a third-party, thus enabling the third-party to execute its plug-ins on the separate process designated for the third-party.

4. The method according to claim 1, wherein spawning the separate process further comprises spawning separate processes for every plug-in.

5. The method according to claim 1, wherein authenticating the plug-in further comprises the user computer verifying the validity of an authentication key.

6. The method according to claim 1, wherein the separate process does not allocate memory and does not spawn other processes.

7. The method according to claim 1, wherein the privilege level of the separate process is dependent on the plug-in the separate process is instructed to execute.

8. One or more computer-readable storage media storing computer-executable instructions for performing a method for securely modifying color schemes within a computer comprising:

loading a plug-in onto a computer, the plug-in being capable of modifying color schemes;

authenticating the plug-in to the user computer;

spawning a separate process from a main process to execute the plug-in;

assigning the separate process a lower privilege level than the main process; and modifying the color scheme in accordance with the plug-in.

9. The method according to claim 8, wherein spawning the separate process further comprises spawning one separate process to run all plug-ins.

10. The method according to claim 8, wherein spawning the separate process further comprises spawning a separate process for a third-party, thus enabling the third-party to execute its plug-ins on the separate process designated for the third-party.

11. The method according to claim 8, wherein spawning the separate process further comprises spawning separate processes for every plug-in.

12. The method according to claim 8, wherein authenticating the plug-in further comprises the user computer verifying the validity of an authentication key.

13. The method according to claim 8, wherein the separate process does not allocate memory and does not spawn other processes.

14. The method according to claim 8, wherein the privilege level of the separate process is dependent on the plug-in the separate process is instructed to execute.

15. A system to securely modify color schemes comprising:

an authentication service for determining the authenticity of a plug-in, the plug-in being capable of modifying color schemes;

a verification service for verifying a previously-loaded plug-in before the previously-loaded plug-in is subsequently executed;

a main processor to running a process for interfacing with plug-ins and for spawning separate processors to execute the plug-ins, wherein the separate processors are of a lower privilege level than the main processor; and a separate processor for modifying the color scheme in accordance with the plug-in.

16. The system according to claim 15, wherein spawning the separate processor further comprises spawning one separate processor to run all plug-ins.

17. The system according to claim 15, wherein spawning the separate processor further comprises spawning a separate processor for a third-party, thus enabling the third-party to execute its plug-ins on the separate processor designated for the third-party.

18. The system according to claim 15, wherein spawning the separate processor further comprises spawning separate processors for every plug-in.

19. The system according to claim 15, wherein the authentication service creates a CAB file to store an authentication key.

20. The system according to claim 15, wherein the privilege level of the separate processor is dependent on the plug-in the separate processor is instructed to execute.

* * * * *